United States Patent [19]

Schabert et al.

[11] 4,118,277
[45] Oct. 3, 1978

[54] STEEL CONTAINMENT FOR NUCLEAR REACTOR INSTALLATIONS

[75] Inventors: Hans-Peter Schabert; Hans Bremer, both of Erlangen; Erich Strickroth, Buckenhof, all of Germany

[73] Assignee: Kraftwerk Union Aktiengesellschaft, Mülheim, Germany

[21] Appl. No.: 742,196

[22] Filed: Nov. 16, 1976

[30] Foreign Application Priority Data

Nov. 17, 1975 [DE] Fed. Rep. of Germany ....... 2551595

[51] Int. Cl.² .............................................. G21C 13/02
[52] U.S. Cl. ......................................... 176/87; 176/38
[58] Field of Search .................................... 176/38, 87

[56] References Cited

U.S. PATENT DOCUMENTS

| | | | |
|---|---|---|---|
| 3,568,384 | 3/1971 | Cruset et al. | 176/87 X |
| 3,605,362 | 9/1971 | Sweeney | 176/87 X |
| 3,929,568 | 12/1975 | Schabert et al. | 176/87 X |
| 3,937,651 | 2/1976 | Schabert et al. | 176/87 X |
| 3,963,565 | 6/1976 | Beine | 176/38 |
| 3,979,866 | 9/1976 | Prescott | 176/87 X |
| 3,994,776 | 11/1976 | Keller | 176/87 X |
| 4,021,297 | 5/1977 | Weber | 176/87 X |
| 4,025,387 | 5/1977 | Haferkamp et al. | 176/87 X |

FOREIGN PATENT DOCUMENTS 1,594,967 7/1970 France ......................................... 176/87

*Primary Examiner*—Peter A. Nelson
*Attorney, Agent, or Firm*—Herbert L. Lerner

[57] ABSTRACT

An assembly of a closed steel containment vessel and a concrete foundation, the containment vessel being partly seated on the concrete foundation and partly free-standing and having built-in structures therein and pipelines extending therethrough, includes a multiplicity of linearly or areally distributed elongated threaded clamping members connecting the built-in structures with the concrete foundations, the threaded clamping members being oriented perpendicularly to the surface of the containment vessel, and resilient packing spacing at least part of the threaded clamping members from the concrete foundation, the resilient packing having a length shorter than the length of the threaded clamping members.

15 Claims, 4 Drawing Figures

STEEL CONTAINMENT FOR NUCLEAR REACTOR INSTALLATIONS

The invention relates to a closed steel containment vessel for nuclear reactor installations or the like, which partly rests on a concrete foundation and has a partly free-standing construction, contains built-in structures, and has pipelines, and especially steam lines, passing therethrough.

In such installations, which also include equipment for the treatment or preparation of nuclear reactor fuel elements and facilities for radiological testing and treatment, the containment vessel has as its purpose the reliable prevention of the escape of any radioactivity. The containment vessel is often constructed as a sphere, the diameter of which depends, for example, upon the power rating of the nuclear power plant. The diameter can be 20 to 50 m or more. The containment vessel may, however, also have a cylindrical shape, at least over relatively large regions thereof.

The containment vessel may itself serve as outer shell or enclosure which is exposed to the weather. The invention, however, also relates to cases wherein the containment vessel is surrounded, in turn, by a so-called secondary shield which, as a solid concrete structure, is supposed to ensure, simultaneously, necessary protection against external mechanical interferences such as airplane crashes, for example.

The containment vessel is provided with built-in structures which support the components belonging to the nuclear reactor plant. In nuclear power plants the components per se have weights that may be as high as several hundreds of tons. The built-in structures, which are usually formed of concrete and must have specific wall thicknesses with a view toward radiation shielding, weigh several times again as much as the components. These weights, together with the weight of the sphere per se, exert pressure upon the concrete foundation. For this reason, reliance has heretofore been placed on uniting the containment vessel, the built-in structures and the concrete foundation so that they are immovable by the weight forces. It was thus assumed that the pipelines extending through the containment vessel are not stressed by external forces such as might result from movements of the containment vessel.

In contrast thereto, it is an object of the invention to ensure the integrity of the aforementioned pipelines in all cases i.e. also in extreme cases, so that the tightness of the containment vessel is not jeopardized by a line break. Thus, any shifting between the containment vessel and the concrete foundation is to be precluded also if, for example, earthquake forces such as have not been observed in Europe or in the United States heretofore, should occur.

With the foregoing and other objects in view, there are provided, in accordance with the invention, in an assembly of a closed steel containment vessel and a concrete foundation, the containment vessel being partly seated on the concrete foundation and partly free-standing and having built-in structures therein and pipelines extending therethrough, a multiplicity of linearly or areally distributed elongated threaded clamping members connecting the built-in structures with the concrete foundations, the threaded clamping members being oriented perpendicularly to the surface of the containment vessel, and resilient packing spacing at least part of the threaded clamping members from the concrete foundation, the resilient packing having a length shorter than the length of the threaded clamping members. The threaded clamping members are bolts externally threaded at the ends thereof and are meant herein to be elements which are independent of the hereinaforementioned pipelines and can transmit considerable forces. The required forces are to be determined in accordance with the masses which are present within the interior of the containment vessel and are constituted by the containment vessel per se, and in accordance with the maximal accelerations to be assumed. In a pressurized-water reactor for 1000 MWe or more, forty clamping bolts, for example, may be provided, for connecting the built-ins of the spherical containment vessel and the concrete foundation, the bolts being preferably distributed in a circle. Each of these clamping bolts acts with a prestressing force or pretension of 500 Mp (megaponds) or 500,00 kg as the fastening force. The total force input according to the invention is then 20,000 Mp or 20 million kg, which is to be effective over an area as large as possible in order to keep the local stresses low.

In accordance with another feature of the invention, the clamping bolts extend with lateral clearance through holds formed in the containment vessel, and sealing means are provided for closing the bores.

In accordance with a further feature of the invention, a multiplicity of pipe lengths or stubs are provided wherein the clamping bolts are respectively received, the pipe lengths being rigidly and tightly connected to the containment vessel. The objective of this construction is to adapt or accommodate to slight relative movements developing in the spherical surface of the containment vessel relative to the concrete, under internal pressure. No excessive stresses are thereby to be produced in the pipe stubs or lengths.

In accordance with an added feature of the invention, the end of the pipe lengths extending out of the containment vessel is located a distance therefrom equal to at least three times the respective diameter of the pipe lengths. The construction is largely symmetrical and, in accordance with an additional feature of the invention, the pipe lengths are connected substantially at the middle thereof to the containment vessel.

In accordance with yet another feature of the invention, respective pressure plates are secured by weldment to the ends of the pipe lengths, one of the ends of the respective pipe lengths being disposed on the concrete foundation and the other of the ends thereof being disposed on a layer of concrete lining at least part of the inner surface of the containment vessel. By pressure plates there is meant large-area structures which afford the hereinaforementioned introduction of the desired holding force.

In accordance with yet another feature of the invention, an intermediate flange is provided by which the pipe lengths are respectively secured to the containment vessel, the intermediate flange having a diameter at least 1.4 times the respective diameter of the pipe lengths. In this manner, it is possible to subsequently secure or retrofit the pipe stub or length to the containment vessel by welding in a manner that the connection cannot break apart under mechanical stress, because the specific stresses are reduced due to the enlarged diameter. Because of the reduced stress, examination or testing of the weld from the rear side (inside) can be dispensed with, and also, in-service or repeated inspection is unnecessary. Also facilitated in the same manner is the production of the fillet seam between the pipe stub or length and the pressure plate, which, similarly, need be welded and inspected only from one side.

For the in-service inspection of the other welded seams, which can be made in situ, access should be available from one side. Such access may be provided, for example, by a passageway which follows the positioning of the clamping bolts. The size of the passageway is advantageously chosen so that the tools necessary for assembly or installation and inspection e.g. hydraulic clamping bolt devices, for example, can be applied without difficulty. In addition with an additional feature of the invention, therefore, the clamping bolts have a respective end thereof located outside of and facing away from the interior of the containment vessel and being disposed in an annular channel encircling the containment vessel wherein the clamping bolts are accessible for assembly purposes.

In accordance with another feature of the invention, the pipe lengths enclose an exhaustible or evacuatable space. What is afforded thereby is that the tightness or seal at the clamping location can be checked at any time, because the confinement of radioactive substances sought to be effected by the containment vessel must not be decreased uncontrollably by the clamping bolts.

As mentioned hereinbefore, the clamping bolts are distributed over an area of the containment vessel that is as large as possible, so that the permissible stresses in the concrete are not exceeded and large forces are nevertheless obtained which also measure up to earthquake accelerations.

In accordance with a further feature of the invention, the clamping bolts are disposed in and on a circle at an edge of the concrete foundation. They are thus not only able to be attached favorably thereat, but they also produce an advantageous lever action with respect to displacements or shifts that may occur in the event of an earthquake.

In accordance with yet an additional feature of the invention, the concrete foundation comprises an upright concrete support cylinder and a concrete calotte mounted upwardly concave on the support cylinder, the concrete calotte having a free edge extending beyond a line of intersection between the concrete calotte and the support cylinder, the circle being located substantially at the intersection line and spaced from the free edge of the concrete calotte. The support cylinder thereby provides an advantageous stiffening of the concrete calotte. On the other hand, the spacing permits the provision of a resilient lining at the edge of the concrete calotte, which prevents excessive stresses, for example, in case of increased internal pressure, in this especially endangered region of the containment vessel.

In accordance with an alternate feature of the invention, the elongated threaded clamping members consist of bolts formed at least partly of a multiplicity of relatively thin tension wires.

In accordance with a concomitant feature of the invention, the clamping bolts are respectively threaded on at least an end thereof, and a cap nut is threadedly secured on the threaded end of a respective bolt, and a pressure plate is rigidly and tightly connected to the cap nut.

Other features which are considered as characteristic for the invention are set forth in the appended claims.

Although the invention is illustrated and described herein as embodied in a steel containment vessel for nuclear reactor installations or the like, it is nevertheless not intended to be limited to the details shown, since various modifications and structural changes may be made therein without departing from the spirit of the invention and within the scope and range of equivalents of the claims.

The construction and method of operation of the invnention, however, together with additional objects and advantages thereof will be best understood from the following description of specific embodiments when read in connection with the accompanying drawings, in which.

Figure 1:
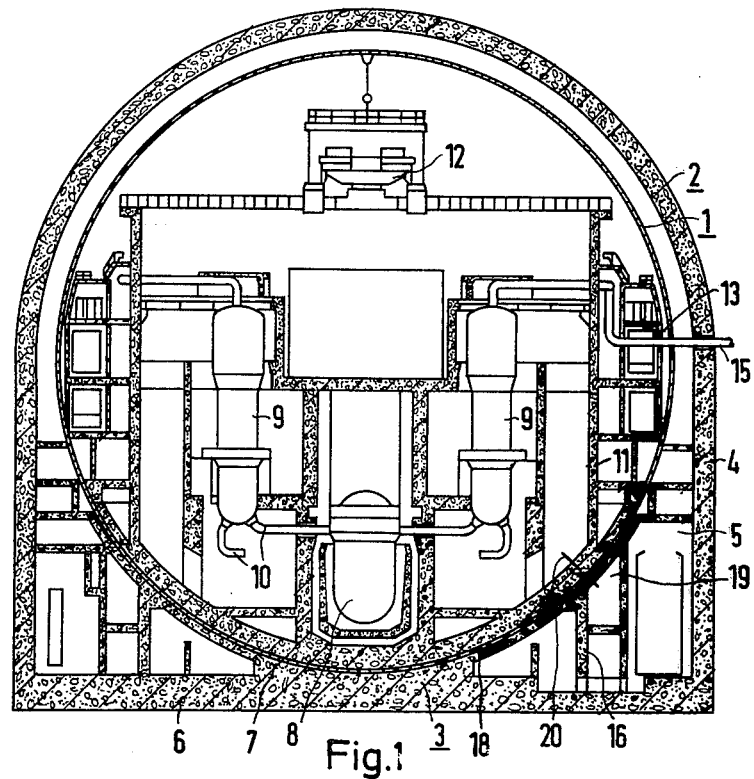
FIGS. 1 and 2 are vertical sectional and a horizontal half-sectional view, respectively, of a nuclear power plant with a pressurized-water reactor showing parts thereof necessary to an understanding of the invention.

Referring now to the drawing and first, particularly, to FIG. 1 thereof, there is shown a containment vessel in the form of a steel sphere 1 having a diameter of 45 m, for example, which is surrounded by a secondary shield 2 formed of concrete. The steel sphere 1 rests or is seated with about one-third of the periphery thereof on a concrete foundation 3, which is structurally united with the foundation 6 of the secondary shield 2 by means of a central region 7 and annular walls 16. An intermediate space 5 of approximately triangular cross section is located between the concrete foundation 3 and the vertical walls 4 of the secondary shield 2, is employed for accommodating auxiliary equipment.

In the containment vessel or shell 1, a reactor pressure vessel 8 and several steam generators 9, that are connected to the reactor pressure vessel 8 through lines 10, are provided, as essential components of the pressurized-water reactor installation with, for example, a thermal power output of 3000 MW. Main coolant pumps, not shown in FIG. 1, are disposed in the succession of pipelines 10.

The aforementioned essential or primary components are enclosed by thick concrete walls. The outer boundary of this enclosure is a so-called fragment or debris-shielding cylinder 11 which, in the event of an accident, intercepts fragments that may have been hurled about, and is supposed, thereby, to protect the containment shell 1.

A revolving crane 12, that can carry a loading machine is disposed on the debris-shielding cylinder 11. The spaces 13 between the debris-shielding cylinder 11 and the sphere 1 enclosing the latter is utilized to house additional auxiliary equipment. Thereat, steam lines 15 extending from the steam generators 9 pass through the containment vessel 1 in the vicinity of the equator of the sphere and continue in a straight line through the secondary shield 2.

Figure 2:
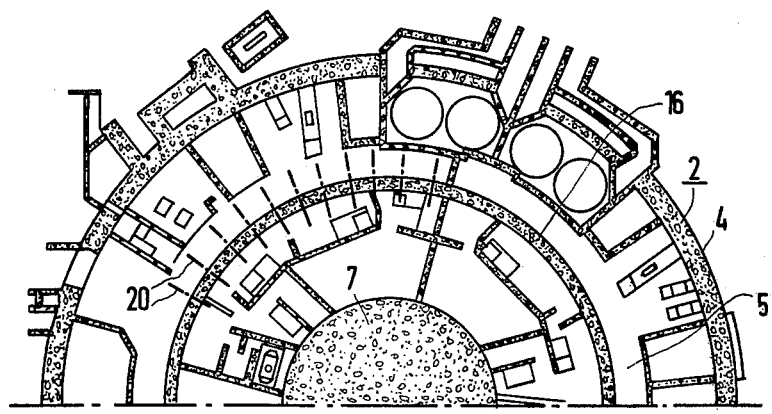

FIG. 2 illustrates the cylindrical construction of the lower portion 4 of the secondary shield 2 and the disposition of auxiliary equipment in the intermediate space 5 between the secondary shield 2 and the sphere 1. An inner wall 16 visible in FIG. 2 as well as a central zone 7, form part of the concrete foundation 3 by means of which the containment vessel 1 is supported.

Figure 3:
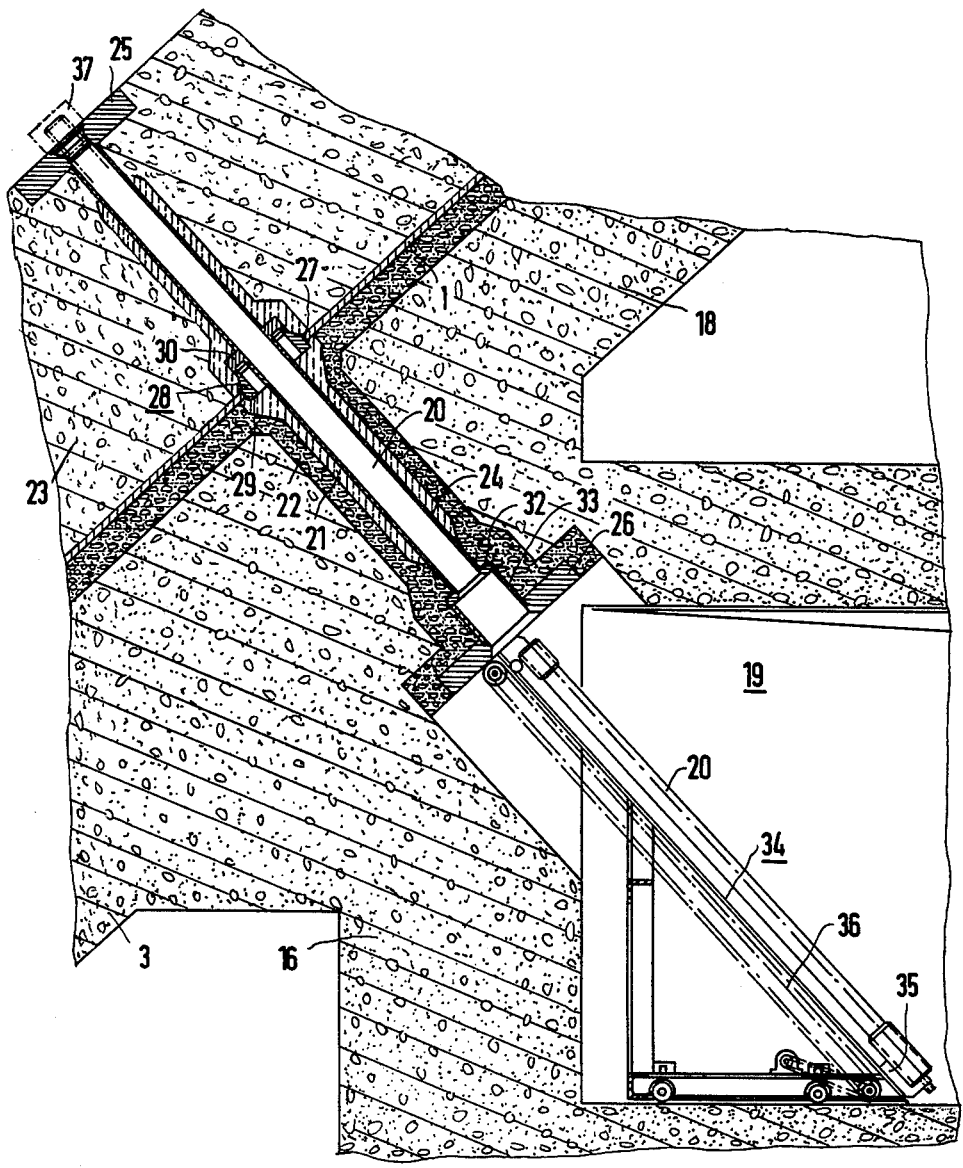
FIG. 3 is an enlarged fragmentary view of FIG. 1 showing a location at which the containment vessel according to the invention is fastened to a concrete foundation by a clamping bolt.

Clamping bolts 20, as shown diagrammatically in FIG. 1 and in greater detail in FIG. 3, extend perpendicularly to the surface of the sphere 1 in the vicinity of the wall 16. The wall 16 forms the inner boundary of a circular annular channel 19 provided for installing the clamping bolts 20. The clamping bolts 20 are disposed in a circular manner in an horizontal plane (FIG. 2). They are uniformly distributed and, in fact, lie on a circle visible in FIG. 2 which substantially coincides with the circular wall 16. Forty of the clamping bolts 20 are provided at a mutual spacing of about 2 m.

As shown in FIG. 3, the concrete foundation 3 is formed with an opening 22 in vicinity of the wall 16. A corresponding opening is formed in a concrete layer 23 located on the inside of the sphere 1. The opening 22 preferably contains a resilient packing 21, for example, of Styropor, over the greater part of the length i.e. depth, thereof. A pipe stub 24 extends through the recess 22 and is welded to a pressure plate 25 on the inside of the sphere 1. A similar pressure plate 26 is seated also at the radially outer end of the pipe 24. Between the pipe stub 24 and the containment vessel 1 is formed with a hole 27 in the vicinity of a respective clamping bolt 20, the latter passing through the hole 27. A welded structure 28 is disposed between the pipe stub 24 and that part of the containment vessel 1 defining the hole 27, and is formed of a pipe section 29 and a flange 30. At the location where the welded structure 28 engages or connects with the containment vessel 1, the welded structure 28 has a diameter at least 1.4 times as large as that of the pipe 24 which surrounds the clamping bolt or screw 20. A similar enlargement of the diameter or widening of the welded structure 28, which is achieved by means of a plate 32 and a pipe section 33, is provided between the pipe 24 and the pressure plate 26.

It is also noted from FIG. 3 that, for the purpose of installing the clamping bolt 20, a transport carriage 34 having a slide 35 for the lower end of the clamping bolt 20 is provided in the annular channel 19. With this slide 35, which can be moved by means of a motor-driven chain 36, the clamping bolt 20 can be driven so far into the pipe stub 24, that a cap or cover nut 37, as shown in phantom in FIG. 3, is mountable thereon on the inside of the sphere 1.

Figure 4:
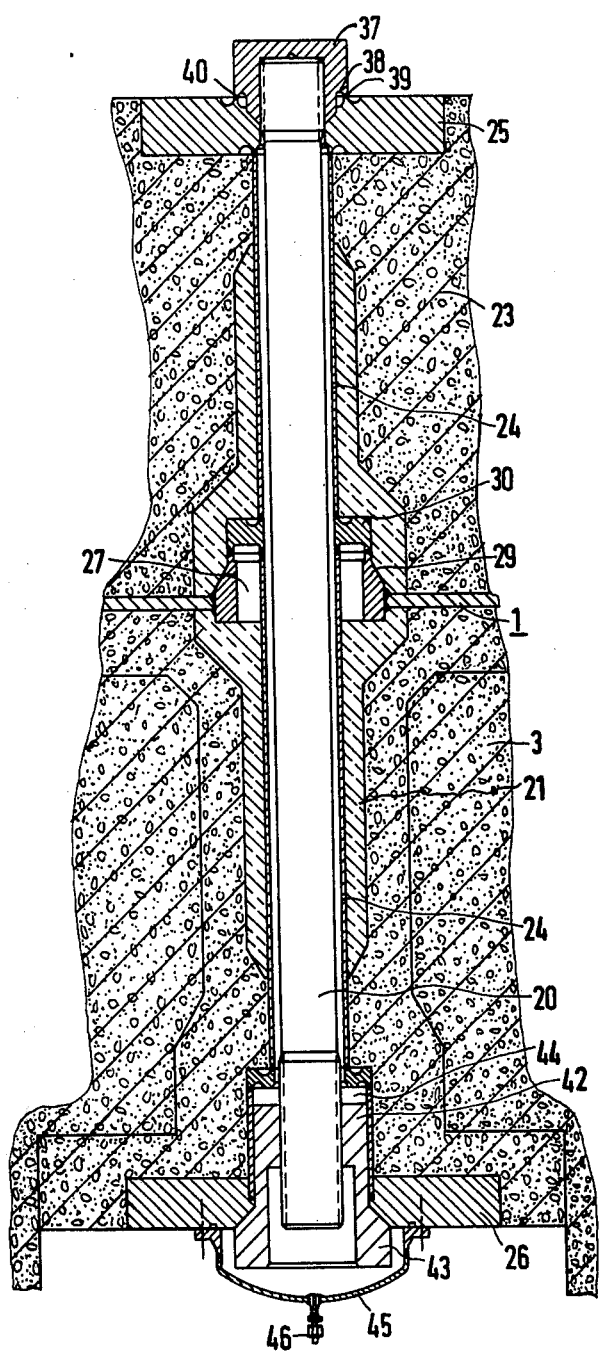
FIG. 4 is an enlarged view of FIG. 3 rotated through an angle so that the clamping bolt is in a vertical position and showing additional details of the invention.

In installed condition, a fastening or clamping is effected as shown in FIG. 4, by means of which a force of 500 Mp (megapond) can be applied over a relatively large area in the vicinity of a single clamping bolt 20. The cap screw 37 has a projecting rim 39 which is formed by a groove 38 and is used for making a tight weld 40. A nut 42 is screwed onto the other end of the clamping bolt 20. The nut 42 is formed with a conical head 43 which lies on the pressure plate 26. The interior 44 of the pipe stub 24 is completely sealed thereat from the exterior by a cap 45. The interior 44 is therefore an evacuatable intermediate space, and a connector 46 is provided for exhausting or evacuating the interior 44.

The containment vessel 1 and the concrete foundation 3 which, together with the secondary shield 2, can be considered as forming an integral structure, are connected so strongly by the clamping bolts 20, that even upon the occurrence of the greatest earthquake forces that might be expected, no displacements or shifts are produced that might endanger the pipelines extending through the containment, especially the steam lines 15.

In FIGS. 3 and 4, the clamping bolt 20 is shown as a solid bolt. However, it may also be constructed, possibly in a thin tube, with a multiplicity of thin tension wires disposed in a conventional manner. Such a clamping bolt is distinguished by an especially high tensile strength and elasticity.

We claim:

1. In an assembly of a closed steel containment vessel and a concrete foundation, the containment vessel being partly seated on the concrete foundation and partly free-standing, built-in structures being received in the containment vessel and pipelines extending through the containment vessel, a multiplicity of linearly distributed elongated threaded clamping members connecting the built-in structures with the concrete foundation, said threaded clamping members being oriented perpendicularly to the surface of the containment vessel, and resilient packing spacing at least part of said threaded clamping members from the concrete foundation, said resilient packing having a length shorter than the length of said threaded clamping members.

2. The assembly according to claim 1 wherein said multiplicity of elongated threaded clamping members are disposed in a common plane.

3. The assembly according to claim 1 wherein said clamping members are bolts externally threaded at the ends thereof.

4. The assembly according to claim 1 wherein said elongated threaded clamping members extend with lateral clearance through bores formed in the containment vessel and including sealing means for closing said bores.

5. In an assembly of a closed steel containment vessel and a concrete foundation, the containment vessel being partly seated on the concrete foundation and partly free-standing, built-in structures being received in the containment vessel and pipelines extending through the containment vessel, a multiplicity of linearly distributed elongated threaded clamping members connecting the built-in structures with the concrete foundation, said threaded clamping members being oriented perpendicularly to the surface of the containment vessel, resilient packing spacing at least part of said threaded clamping members from the concrete foundation, said resilient packing having a length shorter than the length of said threaded clamping members, and a multiplicity of pipe lengths at least partly spaced by said packing from the concrete foundation and receiving said elongated threaded clamping members respectively therein, said pipe lengths being rigidly and tightly connected to the containment vessel.

6. The assembly according to claim 5 wherein the end of said pipe lengths extending away from the containment vessel is located a distance therefrom equal to at least three times the respective diameter of said pipe lengths.

7. The assembly according to claim 6 wherein said pipe lengths are connected substantially at the middle thereof to the containment vessel.

8. The assembly according to claim 1 including a multiplicity of pipe lengths wherein said elongated threaded clamping members are respectively received, said pipe lengths being rigidly and tightly connected to the containment vessel, and means including a respective intermediate flange for securing said pipe lengths to the containment vessel, said intermediate flange having a diameter at least 1.4 times the respective diameter of said pipe lengths.

9. The assembly according to claim 1 including a multiplicity of pipe lengths wherein said elongated threaded clamping members are respectively received, said pipe lengths being rigidly and tightly connected to the containment vessel, respective pressure plates secured by weldment to the ends of said pipe lengths, one of the ends of the respective pipe lengths being disposed on the concrete foundation and the other of the ends thereof being disposed on a layer of concrete lining at least part of the inner surface of the containment vessel.

10. The assembly according to claim 1 including a multiplicity of pipe lengths wherein said elongated threaded clamping members are respectively received, said pipe lengths being rigidly and tightly connected to the containment vessel and enclosing an evacuatable space.

11. The assembly according to claim 1 wherein said elongated threaded clamping members are in the form of bolts disposed in a circle at an edge of the concrete foundation.

12. The assembly according to claim 11 wherein the concrete foundation comprises an upright concrete support cylinder and a concrete calotte mounted upwardly concave on said support cylinder, said concrete calotte having a free edge extending beyond a line of intersection between said concrete calotte and said support cylinder, said circle being located substantially at said intersection line and spaced from said free edge of said concrete calotte.

13. The assembly according to claim 12 wherein said elongated threaded clamping members have a respective end thereof located outside of and facing away from the interior of the containment vessel and being disposed in an annular channel encircling the containment vessel wherein said elongated threaded clamping members are accessible for assembly purposes.

14. The assembly according to claim 1 wherein said elongated threaded clamping members consist of bolts formed at least partly of a multiplicity of relatively thin tension wires.

15. The assembly according to claim 1 wherein said elongated threaded clamping members are bolts respectively threaded on at least an end thereof, and including a cap nut threadedly secured on the threaded end of a respective bolt, and a pressure plate rigidly and tightly connected to said cap nut.

* * * * *